United States Patent Office 3,393,320
Patented July 16, 1968

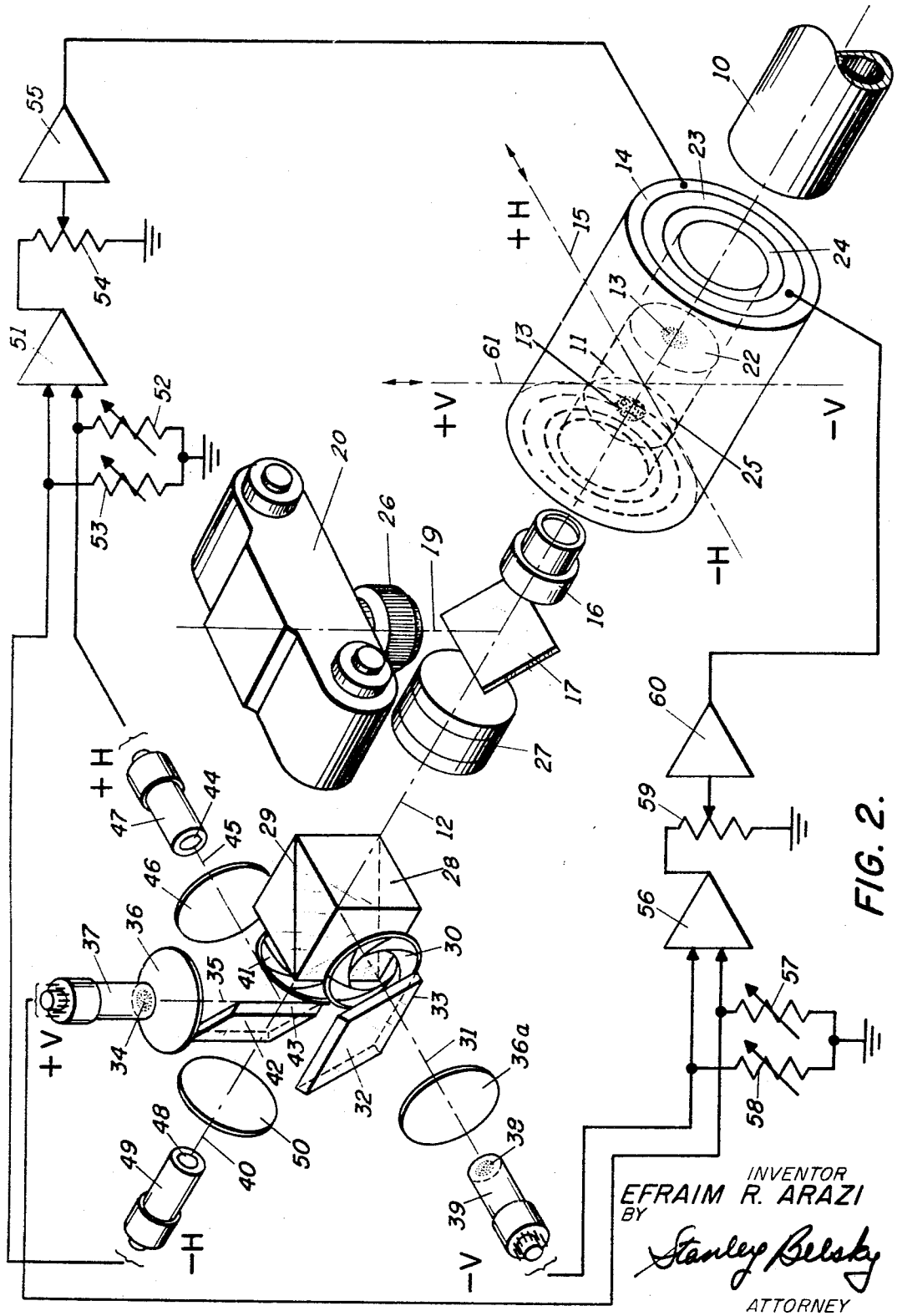

3,393,320
DATA PATTERN MOTION CANCELLATION SYSTEM USING IMAGE AMPLIFIER WITH ELECTRICAL DEFLECTION OF THE ELECTRON STREAM
Efraim R. Arazi, Cambridge, Mass., assignor to Itek Corporation, Lexington, Mass., a corporation of Delaware
Filed Aug. 7, 1964, Ser. No. 388,251
15 Claims. (Cl. 250—217)

ABSTRACT OF THE DISCLOSURE

This disclosure illustrates a system for converting an optical image to be stabilized into an electron stream image, which is electrically deflectable, and reconverting the electron stream image back into an optical image. All or part of the original optical image is examined by two pairs of photosensitive transducers which generate error signals when the image tends to shift which signals cause the electron stream image to be deflected in a direction and to an extent to produce stabilization of the optical image presented to the photosensitive transducers.

Figure 1:
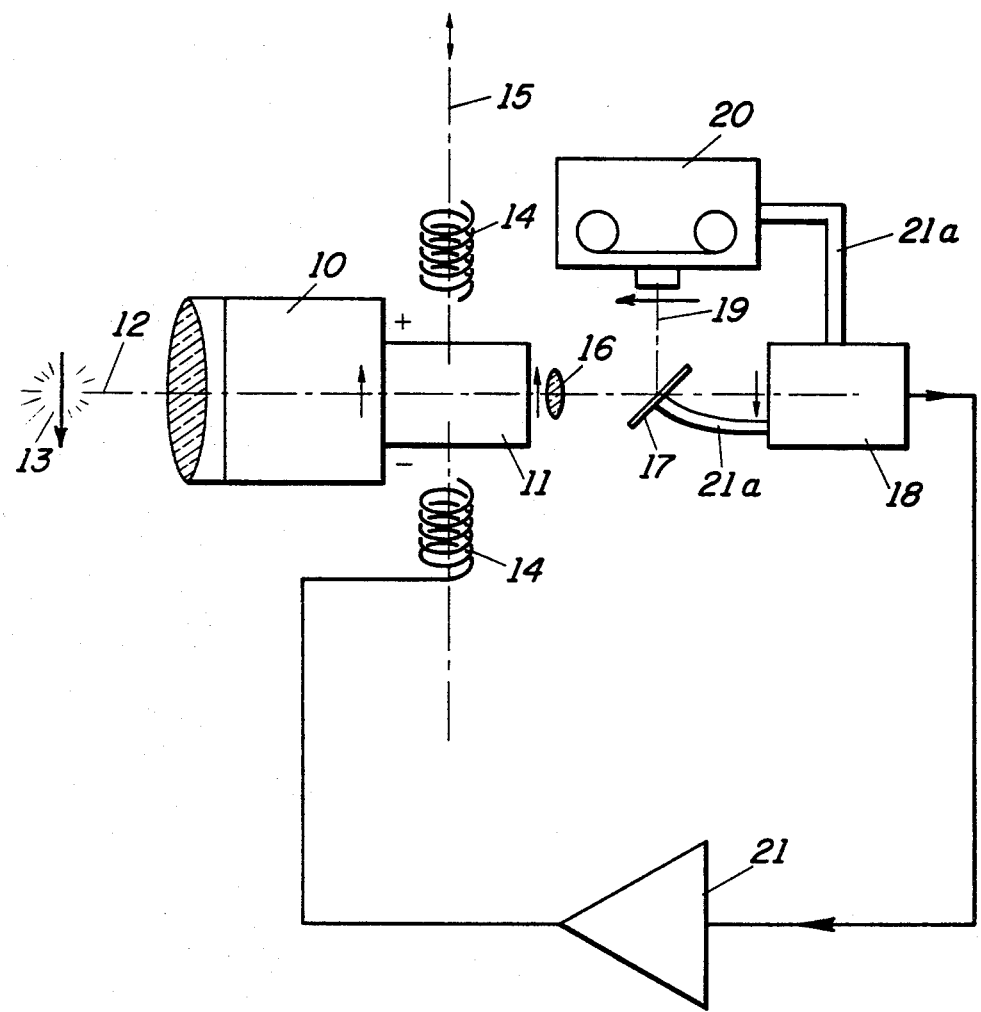

The present invention relates to optical devices and techniques for sighting a remote object. More particularly, the invention relates to devices and techniques for stabilizing an optical image in a field of view. More particularly, the present invention relates to an electronic image motion cancellation camera system for cancelling apparent dynamic displacement of a remote object relative to the camera field.

A major problem in modern astronomical photography is to obtain pictures of objects of low brightness which have an apparent dynamic displacement with respect to the camera. Scintillations in the upper atmosphere cause bad seeing conditions which produce apparent image motion of the order of a few seconds of arc with a frequency spectrum as high as 100 cycles per second or higher. Furthermore, problems of this character arise from unstable platforms associated for example, with space craft photography or from relatively light weight, grounded space telescopes of wide aperture.

Conventionally, a partial solution to such problems is provided by setting the exposure time as short as possible in order to cut down the apparent blurring of the image due to angular motion. The quality of such photographs is limited, however, because of the short exposure time set by the relatively high rate of vibration encountered.

This problem is well-recognized in the prior art and various solutions have been proposed. In an article entitled "Concerning the Problems of Making Sharper Photographs of the Planets" which appeared in the Scientific American, June 1956, authored by Robert B. Leighton, a guiding device is disclosed directed to a solution to the problem of stabilizing an image with respect to the focal plane of a camera attached to an astronomical telescope. In the Leighton device a small enlarging lens is mounted on a doubly pivoted carriage which permits the lens about half a millimeter of transverse motion in any directions. The two components of this motion are governed by a pair of small electromagnets. The light from the telescope forms an image in the focal plane of the telescope, proceeds past the focal point of the telescope and is reflected from a partly reflecting diagonal mirror to come to focus at the film plane of the camera. Part of the light proceeds through the partly reflecting diagonal mirror and focuses on a reticle. Two small reflecting prisms project slightly into the beam at the reticle from two directions at the focal plane and project a small amount of the light into each one of two photo multiplier tubes. The signals from the photo tubes are applied to the electromagnet coils that control the position of the lens. This system is null-seeking and seeks a stable condition when an appropriate amount of light enters each photo tube. If the telescope image moves by a small amount the relative amount of light into the photo tube changes and the system responds in such a way as to cancel out the motion. This system is limited in response, however, to a dynamic image motion frequency of the order of two cycles per second.

The Leighton device is subject to false displacement signals in response to variations in image intensity. In contrast, variations in image brightness or intensity do not affect the image motion cancellation system of the present invention.

In an article entitled, "A Seeing Compensator Employing Television Techniques," written by Carl K. Seiferd et al. and appearing in Sky and Telescope, November 1957, a system involving the use of an image orthicon camera is disclosed. Here, the optical image is received, transmitted through a beam splitter partially to the camera and partially to a photoelectric sensor. The sensor produces an output error signal indicative of the position of the optical image relatively to an arbitrary referenced position. The output error signal is applied to a special deflection coil operation on the image section of an image orthicon camera to restore the image to its original position. This system, however, is open-looped and does not include a mechanism for introducing negative feedback. For this reason this system is relatively unstable and inaccurate. Because of non-linearities inherent in the sensor, image displacement signals may over or under correct. Since the system is open-looped, there is no mechanism for compensating the error arising during correction, i.e., effect of system nonlinearity. In contrast, the present system is closed-looped and operates on the instantaneous error signal produced relative to a fixed reference point. Since the system continuously corrects for image displacement and responds relatively quickly, non-linearities from the sensor do not appreciably affect the displacement signals.

In the prior art there are a number of devices which have been proposed for electro-optically sensing the presence of an optical image from a remote object, providing an error signal indicative of the displacement of the object from the bore-sight axis of the photo sensitive tracker and applying the signal to the tracker to control its orientation relative to the object. In such devices and systems, as well as other devices of interest described below, the motion of an optical image relative to a fixed field of view is not corrected. Typically the optical seeker orientation is adjusted to track a radiant energy emitting object. In such systems, however, one observes a constant error due to the inertia of the tracking apparatus. In contrast, the instant system is directed to the problem of cancelling the image motion relative to a fixed field of view or focal plane.

In Patent No. 3,098,933, issued to H. P. Barasch, a photosensitive electronic tracking head is disclosed which utilizes an image intensifier tube. Here a tracking device serves to produce signals indicating the position of a missile relative to a tracking axis of an optical system. In this system the signals developed by the tracking device are fed to a command computer which converts the signal into command signals for directing the missile flight into agreement with a given optical axis. In simplified form, an optical image is transmitted to the receiving face of an image intensifier or converter tube with the inner surface of its receiving face coated with a photosensitive material. The material has the property of emitting electrons when activated by light. In response to the optical image the photosensitive coating emits a stream of electrons that is accelerated and focused by conventional means, for example, magnetic or electrostatic focusing. The electron stream image impinges upon and activates a fluorescent output coating applied to the output wall of the image converter tube. The output optical image is projected to a photoelectric sensing element, such as, a photo multiplied tube, which is responsive to a displacement of the image from the boresight axis. The photosensing element produces an output error signal to redirect the missile, and, hence, the image position. As the missile moves, a signal is applied to the magnetic deflection coil coupled to the image converter tube to deflect the image to coincide with the new missile position relative to the optical axis.

In Patent No. 2,877,354, issued to A. F. Fairbanks et al., a radiation tracker for aiming at center or centroid of multiple targets is disclosed. Here again, an optical image is photoelectrically sensed and an error signal produced in proportion to the displacement of the image from the boresight or tracking axis. The output error signal is coupled to several motors which drive the optical tracker and maintain it on boresight with respect to a remote target object. In Patent No. 2,921,757, issued to R. E. Houle, a long range automatic navigator device is disclosed which tracks a remote celestial object such as a bright star for navigation purposes. Here, an optical tracker is coupled to a photoelectric sensor which produces an output error tracking signal which is coupled to a servo system to maintain the optical tracker in alignment with the remote celestial object.

In an article entitled "Opt-Electric Transducer Follows Movement" appearing in Measurement and Control, October 1963, pp. 385–387, an electro-optical system is disclosed for optically following a vibrating element. The instrument generates a 1 millimeter spot of light which locks on to the edge of the moving part and provides an output proportional to the displacement. The spot of light which senses the displacement or movement is produced by a cathode ray tube. After passing through a vertical exit slit and a beam splitter, the spot is focused onto the edge of the part being examined. The spot is arranged to be bisected by the edge so that half the light beam passes beyond the part and the other half falls onto the part and is reflected by it. Because the edge of the part is placed on the same plane as the optical axis, the half beam is reflected back into the instrument and passes through the beam splitter and a 45° mirror through a horizontal slit to a photosensing device. The photosensing device produces an output error signal which is a function of the spot displacement which is applied to the vertical deflection plates of the cathode ray tube. Here, however, no effort is made to cancel the apparent motion of the optical image. In Patent No. 2,942,121, issued to G. A. Hotham, a displacement follower is disclosed somewhat similar in operation to the system described in the Measurement and Control article. In Patent No. 3,033,987, issued to G. H. Hotham, an electronic displacement follower apparatus is disclosed presenting an improvement over Hotham's earlier apparatus; however, the later system functions in a similar manner.

In Patent No. 3,055,260, issued to George Wehling, a photo-electric sight adjusting device is disclosed for automatically sighting a light emitting object. The device photoelectrically produces a signal to control a shutter for the purpose of crispening an optical image.

In Patent No. 2,953,710, issued to J. H. De Witt, Jr., television cameras are disclosed which describe a device for deflecting an electron stream image.

In the light of the prior art it is apparent that the problem of providing a sufficiently stable optical image of a remote object for telescopic viewing and photographic purposes remains unsolved.

It is therefore an object of the invention to provide an improved data pattern motion cancellation system which is stable in its operation.

A further object of the invention is to provide an improved data pattern motion cancellation system capable of cancelling relatively high rates of pattern vibration relative to a predetermined matrix of a data processing means.

Yet another object of the invention is to provide an improved image motion cancellation viewing system particularly applicable to light emitting astronomical objects.

Still another object of the invention is to provide an improved image motion cancellation viewing system having no mechanically moving parts.

A still further object of the invention is to provide an image motion cancellation camera system capable of longer exposure time without loss of resolution or smearing.

Other and further objects of the invention will be apparent from the following description taken in connection with the accompanying drawings, and its scope will be pointed out in the appended claims.

In accordance with the invention there is provided a data pattern motion cancelling data processing system. The system includes transmission means for receiving and transmitting a selected data pattern. The position of the pattern relative to the transmission means is deflectable in response to electromagnetic deflection forces. A data processing means is coupled to the transmission means for locating the pattern with respect to a predetermined matrix. Pattern position sensing means are coupled to the transmission means for producing a pattern position signal. Reference means are provided for producing a reference position signal. Comparator means are coupled to the reference and sensing means for comparing the reference and pattern position signals to produce an error signal in accordance with the apparent displacement of the pattern position relative to the reference position. Electromagnetic deflection means are coupled to the transmission means for deflecting the pattern in response to the error signal, tending thereby to cancel an apparent motion of the pattern relative to the data processing means matrix.

In one form of the invention an image motion cancelling viewing system is provided. The system includes photosensitive image forming means including an image forming electromagnetic medium. The medium is deflectable in response to an electromagnetic deflection force. Viewing means are coupled to the transmission means for viewing the image at a predetermined focal plane along a viewing axis at an angle to a transmission axis.

In another form of the invention, an electronic image motion cancellation camera system is provided. The system includes a base and a telescope mounted on the base for receiving and projecting along a projection axis intersecting a telescope focal plane an optical image of a remote light body to provide an image field having an area of light-dark contrast. Electro-optical image intensifier conversion means are mounted on the base along the projection axis for photo-electrically converting the optical image into an electron stream image and photoelectrically converting the electron stream image into an amplified optical image for projection along the projection axis.

The image conversion means has an evacuated tube concentric with the projection axis with an input face at the telescope focal plane. The input face has a coating of photoelectric material for converting the optical image into an electron stream. Magnetic focusing means are coupled to the tube for focusing the electron stream to provide an electron stream image. The output face of the tube is coated with fluorescent material for converting the electron stream image into an optical image of increased light intensity.

A semi-reflector means is mounted on the base intersecting the projection axis for reflecting the image along a camera axis substantially orthogonal to the projection axis while simultaneously transmitting the image along the projection axis. Camera means are mounted on the base and have a focal plane intersecting the camera axis.

Sensing axes semi-reflector means are mounted on the base for simultaneously reflecting the image along a horizontal sensing axis and along a vertical sensing axis intersecting the horizontal sensing axis. Horizontal variable aperture means are mounted on the base and have a variable aperture for controlling the size of the image field along the horizontal sensing axis. An angularly disposed horizontal mirror is mounted on the base and has a linear edge corresponding to a horizontal reference axis for reflecting a positive horizontal image portion along a positive horizontal sensing axis, while allowing a negative horizontal image portion to be transmitted along the horizontal sensing axis.

A positive horizontal image portion sensing photomultiplier tube is axially aligned along the positive horizontal sensing axis to provide an electrical positive horizontal image portion position signal. A negative horizontal image portion sensing photo-multiplier tube is axially aligned along the horizontal sensing axis to provide an electrical negative horizontal image portion position signal. Horizontal differential amplifier means are coupled to the photo tubes for producing a horizontal image position error signal in response to the difference between the amplitudes of the horizontal position signals. An angularly disposed vertical mirror is mounted on the base and has a linear edge corresponding to a vertical reference axis orthogonally intersecting the horizontal reference axis for reflecting a positive vertical image portion along a positive vertical sensing axis while allowing a negative vertical image portion to be transmitted along the vertical sensing axis. The horizontal error signal is indicative of the horizontal displacement of the image relative to a translation intersection of the reference axes.

A positive vertical image portion sensing photo-multiplier tube is axially aligned along the positive vertical sensing axis to provide an electrical positive vertical image portion signal. A negative vertical image portion sensing photo multiplier tube is axially aligned along the vertical sensing axis to provide an electrical negative vertical image portion position signal. A vertical differential amplifier means is coupled to the vertical sensing photo tubes for producing a vertical image position error signal, indicative of the vertical displacement of the image relative to the intersection of the reference axes, in response to the difference between the amplitudes of the vertical position signals. A horizontal magnetic deflection coil is mounted on the image intensifier conversion tube and is coupled to the horizontal differential amplifier to deflect the electron stream image along a horizontal deflection axis corresponding to the horizontal reference axis. A vertical magnetic deflection coil is mounted on the image intensifier conversion tube and is coupled to the vertical differential amplifier to deflect the electron stream image along a vertical deflection axis corresponding to the vertical reference axis. The system operates in such a manner that a displacement of the image relative to the intersection of the camera focal plane and camera axis tends to be cancelled.

The term "electromagnetic" as used herein includes electric and magnetic fields either separately or in combination. The term "electromagnetic medium" as used herein includes an electron stream. The term "viewing means" as used herein includes means for viewing by eye, photographic camera and image orthicon or other television camera devices. The term "data processing means" as used herein includes viewing means as defined above. The term "dichroic" as used herein includes the characteristic of certain mirror devices wherein a portion of incident energy is transmitted through the mirror and a portion reflected. The term also includes a frequency sensitive mirror which transmits radiant energy of a selected frequency and reflects radiant energy of other frequencies.

In the drawings:

FIG. 1 is a simplified schematic diagram of a single axis image motion cancellation camera system embodying the invention; and FIG. 2 is a partially schematic, exploded perspective view of a dual axes image motion cancellation camera system particularly illustrating the photoelectric position sensing apparatus.

*Description and explanation of the image motion cancellation system in FIG. 1*

Referring now to FIG. 1 there is here illustrated a data pattern motion cancelling data processing system. A transmission means is provided shown in FIG. 1 as including a telescope, an image intensifier and conversion tube and a projection lens. Data processing means are coupled to the transmission means here shown as a viewing means such as a photographic camera with an optical focal plane coinciding with a film plane or an image orthicon tube or other television camera device for viewing a data pattern or optical image. The pattern position sensing means, reference means and comparator means are here shown as a sensor coupled to the transmission means along a projection axis for producing an error signal indicative of the apparent displacement of the pattern position relative to a reference position. Electromagnetic deflection means coupled to the transmission means are shown here as a magnetic deflection coil coupled to the image intensifier. The error signal from the sensor is coupled through an amplifier to the coil.

Thus, a telescope 10 is coupled to an image intensifier tube 11. The image intensifier tube 11 has an input face located at a focal plane of the telescope 10 and is axially oriented along a projection axis 12. The image 13 is presented as a light appearing object on a dark background to provide areas of light-dark contrast. For viewing of the moon, for example, the area of light-dark contrast can be achieved by focusing on the outer most mountains or on a dark crater having an associated area which is light emitting.

The tube 11 includes a deflectable image forming electron stream. Here the electromagnetic deflection means is shown as a magnetic field coil 14 coupled to the tube 11 in such a manner as to deflect an electron stream image within the tube along a deflection axis 15. At the output face of the tube 11, to the right as shown, the electron stream image impinges on a fluorescent coating to produce an optical image projected through a projection lens 16. The image continues to be projected along the axis 12 to the reflection means here shown as a dichroic mirror 17. The mirror 17 is oriented at an angle intersecting the axis 12. Part of the energy is transmitted through the mirror to a sensor 18. The rest of the energy is reflected by the mirror 17 along a viewing or camera axis 19 to the camera 20. The axis 19 is oriented at an angle and intersects the axis 12. Here the angle is substantially a right angle hence the axis 19 is substantially orthogonal to the axis 12. The camera 20 is shown mechanically coupled to the sensor 18 by the double lines 21a. The output of the sensor 18 is an error signal indicative of the displacement of the image from, for example, the viewing axis 19. The output is coupled to an amplifier 21 which is in turn coupled to the deflection coil 14. Each of the elements of this system as shown are preferably mounted on a common base which is not shown in the drawings for the purpose of clarity.

*Operation*

The optical image 13 is received at the objective lens of the telescope 10 and transmitted along the projection axis 12 to the input face of the image intensifier conversion tube 11. A photosensitive coating on the input face of the tube 11 photoelectrically converts the optical image into an electron stream. The stream is accelerated by an internal electric field. Magnetic focussing means associated with the tube 11 focuses the electron stream to provide an electron stream image at the outer face of the tube 11. The outer face of the tube 11 is coated with fluorescent material which fluoresces in response to the impingement of the electrons thereon to produce an optical image. The optical image thus produced is normally amplified in intensity relative to the image at the input face of the tube 11. For some applications, however, it may not be required to reproduce the input image at the greater intensity. The optical image is projected through the projection lens 16 to the dichroic mirror 17 where it is split. One split image is reflected along the camera axis 19 to the focal plane of the camera. At that point it may be viewed by eye, it may be viewed by an image orthicon camera or other television camera devices or it may impinge on a film plane coinciding with the optical plane and recorded photographically.

A portion of the energy is transmitted through the mirror 17 to a sensor 18 which photoelectrically senses the image position, compares it with a reference position corresponding, for example, to the intersection of the focal plane of the camera 20 and the camera axis 19.

When the image is symmetrically positioned with respect to the projection axis 12 the output of the sensor 18 is zero. When the image is displaced relative to the projection axis 12 upwardly or in the plus direction as shown in the drawings, an error signal is produced by the sensor 18 which is coupled through the amplifier 21 to the magnetic deflection coil 14. The error signal is proportional to the degree of displacement and its sign to the direction of displacement of the image. Although the error signal instantaneously may be somewhat non-linear relative to image displacement, the closed-loop operation of the system continuously corrects for apparent image displacement and is, therefore, relatively independent of sensor non-linearities. Thus, the error signal is applied to the magnetic coil 14 in such a manner as to deflect the electron stream image in a negative direction tending to cancel its apparent motion relative to the projection axis. Conversely, when the displacement of the image is in the negative direction, the error signal is applied to the coil 14 in such a manner as to deflect the electron image in the tube 11 upwardly or in the plus direction along the deflection axis 15.

In the simplified diagram shown in FIG. 1 the system operates with respect to only a single deflection axis. It will be apparent that this system is applicable to a position sensitive pattern forming medium where it is desirable to process the pattern with relatively high resolution. The principles of the system thus apply to a data processing means having a predetermined matrix position for cancelling motion of the pattern relative to the matrix.

The image intensifier tube has been primarily developed to amplify light. In the present system it has added an important feature in that it presents a magnetically deflectable image forming electron stream. Typically, magnetic deflection responds to frequencies as high as megacycles. The typical image intensifier tube contains an input photo cathode, an electron lens and an output fluorescent phosphor screen. Light focused on the photo cathode releases photo electrons which are accelerated by an electrostatic field, for example, of the order of 20,000 volts. The accelerated electrons impinge on the phosphor screen causing it to emit light. Imaging of the photo electrons from the photo cathode onto the phosphor screen may be obtained for example, by applying a focusing magnetic field of the order of 360 gauss. An image intensifier useful in the present invention is model C70077A as manufactured by the Radio Corporation of America. This model is a single stage, magnetically focused image converter tube utilizing a short persistence phosphor and a semi-transparent photo cathode. The photo cathode has a diameter of 3½ inches and a maximum response at approximately 4,200 A. The tube has four accelerating electrodes which may be operated on a supply voltage not exceeding 20,000 volts.

The sensing, reference and comparator means useful in the system of FIG. 1 may be any of a number which are well-known in the art. One example, is shown in Patent No. 3,041,011, issued June 26, 1962 to L. W. Dhanes a photo electric quadrature system for position sensing of an image is disclosed. Other such systems are disclosed in the above-referenced publications, particularly those directed to various follower and tracking systems.

*Description and explanation of the electronic image motion cancellation camera system illustrated in FIG. 2*

Referring now to FIG. 2 there is here illustrated an exploded perspective view, partially schematic, of a dual axis electronic image motion cancellation camera system embodying the invention. In the system of FIG. 2 corresponding or analogous elements have the same reference numerals as the reference numerals in FIG. 1.

Here again we have a telescope for receiving an image and projecting it along a projection axis. An image intensifier conversion tube is coupled to the telescope and concentrically aligned with the projection axis. A projection lens couples the image from the intensifier tube to a dichroic mirror which projects the image along a viewing axis to a camera and receiving lens for the camera. The image is projected through the dichroic mirror and a second projecting lens to a beam splitting prism. Part of the energy continues along a projection axis through a variable iris opening which here becomes a horizontal sensing axis. The other part of the energy is reflected through a variable iris opening along a vertical sensing axis oriented at an angle to the horizontal sensing axis.

Associated with each of the sensing axes is a knife-edge mirror angularly so disposed with respect to the iris openings as to reflect a positive image portion through a condensing lens along a positive image portion sensing axis to a positive image portion sensing photo multiplier tube. The negative image portion is transmitted, without impinging on the mirror, through a condensing lens to a negative image portion sensing photo multiplier tube.

The horizontal image position sensing photo tubes are coupled to a differential amplifier which is coupled to a current amplifier to the horizontal magnetic deflection coil on the image intensifier tube. Similarly, the vertical photo tubes are coupled to a differential amplifier and thence through a current amplifier to a vertical magnetic deflection coil on the image intensifier tube. The components are mounted on or coupled to a base which is again not shown for purposes of clarity.

Thus, the telescope 10 projects the image 13 to the input face 22 of the tube 11. Surrounding the tube is the horizontal deflection coil 14, a vertical deflection coil 23 and a focusing coil 24. At the input face 22 the optical image 13 is converted into an electron stream image which impinges on the output face 25 and is again converted to an optical image of higher intensity. The optical image is projected along the axis 22 to the projection collimating lens 16 and then to the dichroic mirror 17. The image is reflected upwardly, as shown, along the camera axis 19 through a camera lens 26 to the camera 20. The image is transmitted through the mirror 17 to a second projecting lens 27 along the axis 12 to a beam splitting prism 28. A diagonal interface surface 29 provides a reflecting surface for the image to transmit it through an opening of a variable opening iris diaphragm 30 along a vertical sensing axis 31. The image is then transmitted to an angularly disposed knife-edge mirror 32 which has a linear edge 33 which substantially bisects the iris opening at the vertical sensing axis. The upper or positive image portion 34, as shown, is reflected along a positive image portion sensing axis 35 through a condensing lens 36 to a positive image portion position sensing photo multiplier 37. The lower or negative image portion 38 is transmitted along the vertical sensing axis 31 through a condensing lens 36a to a negative image portion position sensing photo multiplier tube 39.

The image is projected along the horizontal sensing axis 40, which coincides with the projection axis 12, through the opening of a variable opening iris diaphragm 41 to an angularly disposed horizontal mirror 42 having a knife-edge 43 which provides a horizontal reference axis. The axes 33 and 43 are mutually orthogonal. When the mirror 32 is translated to the plane of knife-edge 43 and appropriately centered, a translated intersection point becomes in effect a reference point or null position for the system. A right or positive horizontal image portion 44 is reflected along a positive horizontal sensing axis 45 through a condensing lens 46 to a positive horizontal image portion position sensing photo multiplier tube 47. The knife-edge 43 is so disposed as substantially to bisect the opening of the iris diaphragm 41 and therefore dissects the image into positive and negative portions. The left as shown or negative horizontal image portion 48 is transmitted by the knife-edge mirror 42 along the horizontal sensing axis 40 through a condensing lens 50 to the negative horizontal image portion position sensing photo multiplier tube 49.

The horizontal photo tubes 47 and 49 are coupled to the input of a horizontal differential amplifier 51. Adjustable balancing resistors 52 and 53 are shown connected from the input of the amplifier 51 to ground. The output of the amplifier 51 is coupled to a horizontal error signal variable gain control 54. The variable tap of the control 54 is coupled to a horizontal error signal amplifier, a current amplifier, 55. The amplifier is in turn coupled to the horizontal deflection coil 14. The coil 14 deflects the image forming electron streams in the intensifier tube 11 along the horizontal deflection axis 15.

Analogously, the vertical photo tubes 37 and 39 are coupled to a vertical differential amplifier 56. Variable balancing resistors 57 and 58 extend from the input connections of the amplifier 56 to ground. The output of the amplifier 56 is coupled to a vertical error signal variable gain control 59. The variable tap of the control 59 is coupled to a vertical error signal amplifier 60. The amplifier 60 is also a current amplifier and its output is connected to the vertical deflection coil 23 which deflects the image forming electron stream in the intensifier tube 11 along a vertical deflection axis 61.

*Operation*

The image 13 is received by the telescope 10 and transmitted along the projection axis 12 to the input face of the intensifier tube 11. The optical image is converted into an electron stream image and transmitted through the tube to impinge on the output face 25 of the tube 11. Electron stream image is converted to an optical image at a higher light intensity which is projected further along axis 12 through the collimating lens 16 to the dichroic mirror 17. A portion of the energy is reflected along camera axis 19 to the focal plane of the camera 20. The remainder of the energy is transmitted through the mirror 17 and a projecting lens 27 further along the projection axis 12 to the prism 28. Part of the energy is reflected from the diagonal interface 29 of the prism along a vertical sensing axis 31 through the opening of the iris diaphragm 30. The diaphragm 30 is adjustable to control the size of the image field. A positive image portion 34 is reflected by the mirror 32 along the positive vertical sensing axis 35 through the condensing lens 36 to the photo tube 37. The negative vertical image portion 38 is transmitted along the vertical sensing axis 31, without impinging on the mirror 32, through the condensing lens 36a to the tube 39. The remainder of the energy is transmitted through the opening of the horizontal iris diaphragm 41 along the horizontal sensing axis 40. The positive image portion 44 is reflected by the mirror 42 along the positive horizontal sensing axis 45 through the condensing lens 46 to the photo tube 47. The negative horizontal image portion 48 is transmitted, without impinging on the mirror 42, through the condensing lens 50 to the photo tube 49.

The horizontal image portion position signals are applied to the horizontal differential amplifier 51 which provides an output error signal in proportion to the difference between the amplitudes of the horizontal image portion position signals. The output of the amplifier 51 is indicative, e.g., of the amount of displacement of the image along the horizontal deflection axis with respect to the projection axis 12. The sign of the error signal plus or minus corresponds with a plus horizontal or minus horizontal deflection necessary to cancel the apparent displacement along the horizontal deflection axis 15 relative to the projection axis 12. Again, if the optical image 13 is symmetrically oriented with respect to the projection axis 12, the net error signal in both the horizontal and vertical systems is zero.

If the image is displaced from the axis 12 along a radius intermediate the horizontal and vertical deflection axes both a vertical and horizontal error signal are produced tending to restore the image at the output face of the intensifier tube so that it is again symmetrically disposed with respect to the axis 12. The system thus operates as a null-seeking system to stabilize the apparent position of the image at the output face 25 of the intensifier tube constant with respect to the axis 12. Since the camera 20 is fixed relative to the tube 11 and the vertical and horizontal sensing system, image motion relative to the intersection of the focal plane of the camera 20 and the camera axis 19 tends to be cancelled. An initial displacement to the left or in the direction of the negative horizontal deflection causes the image at the output face 25 of the tube 11 to appear to the negative or left of the axis 12. The image is transmitted through to the horizontal knife-edge mirror 42. The displacement to the left causes the negative horizontal image portion 48 to be greater than the positive horizontal image portion 44. The positive image portion is transmitted to the photo tube 47 and produces an output positive indicating signal of lesser amplitude than the tube 49 which responds to the negative image portion 48. Since the net difference between the amplitudes of the horizontal position signals at the input of the amplifier 51 is a negative indicating horizontal displacement, the output of the amplifier 51 produces an error signal tending to counteract the negative displacement. Thus, a positive direction horizontal signal is coupled through the amplifier 55 to the horizontal deflection coil 14 to deflect the electron stream image positively or to the right to restore it to its null position. Note that the input optical image at the input face 22 is still displaced from the axis 12. The image reproduced at the output face 25 however, has been corrected with respect to its horizontal displacement and is indeed horizontally symmetrically disposed with respect to the axis 12.

The operation of the vertical sensing system is directly analogous to the horizontal system. In the event of a vertical displacement of the image a net difference in amplitudes between the positive vertical image portion 34 and the negative vertical image portion 38 produces an output signal from the amplifier 56 tending to restore the image to its null position relative to the vertical axis.

*Description and explanation of combination image motion cancellation system and image tracking system*

While the apparent image motion is cancelled and the apparent image is maintained at a reference position, the displacement of the true image relative to the optical receiving axis remains uncorrected. By combining a system for orienting the telescope with the object, i.e., tracking the object while simultaneously cancelling the apparent image motion in the manner of the present invention, the true image is precluded from leaving the field of view.

Any of a number of well-known optical tracking systems may be combined with the present system to provide the desired result. By coupling a servo train to drive the telescope 10 in FIGS. 1 and 2 and dichroically projecting the received image along a tracking axis while simultaneously translating the image along the projection axis 12, a combination tracking and image motion cancellation system is obtained.

The above-referenced tracking systems are applicable to such a combination system, e.g., Patents Nos. 3,098,933; 2,877,354; and 2,921,757.

From the foregoing description it will be apparent that the invention has broad application to the field of data pattern sensing and control. The recording and processing of coherent data patterns is thereby greatly enhanced. It will be apparent that the invention has an important application in the area of astronomical viewing and photography.

While there has hereinbefore been presented what are at present considered to be the preferred embodiment of the invention, it will be apparent to those of ordinary skill in the art that many and various changes and modifications may be made with respect to the embodiment described and illustrated without departing from the spirit of the invention. It will be understood therefore, that all such changes and modifications as fall fairly within the scope of the present invention, as defined in the appended claims, are to be considered as a part of the present invention.

What is claimed is:

1. A data pattern motion cancelling system comprising:
    (a) an image converter for converting an input light image into a corresponding deflectable electrical image and for reconverting said electrical image back into an output light image;
    (b) detection means for detecting the initiation of a shift in the position of said output light image in a given direction; and
    (c) deflection means coupled to said detection means for deflecting said electrical image in a direction and to the extent of at least partially counter-acting said shift which would otherwise occur.

2. The combination as set forth in claim 1 wherein said detection means includes a transducer device optically coupled to said image converter for converting light energy associated with said output light image into electrical energy.

3. The combination as set forth in claim 2 wherein said detection means includes four photo-detectors.

4. The combination as set forth in claim 1 wherein said image converter comprises an image intensifier.

5. The combination as set forth in claim 3 wherein said image converter comprises an image intensifier.

6. The combination as set forth in claim 2 wherein said deflection means comprises means for producing a magnetic field within said image converter.

7. The combination as set forth in claim 6 wherein said deflection means comprises:
    (a) first means for producing a first magnetic field within said image converter; and
    (b) second means for producing a second magnetic field within said image converter substantially orthogonal to said first magnetic field.

8. The combination as set forth in claim 3 wherein said deflection means comprises:
    (a) first means for producing a first magnetic field within said image converter;
    (b) second means for producing a second magnetic field within said image converter substantially orthogonal to said first magnetic field;
    (c) first coupling means for coupling two of said photo-detectors to said first means for producing said first magnetic field; and
    (d) second coupling means for coupling the other two of said photo-detectors to said second means for producing said second magnetic field.

9. The combination as set forth in claim 8 wherein said first coupling means includes a first differential amplifier and said second coupling means includes a second differential amplifier, and means for coupling the input circuit of said first differential amplifier to two of said photo-detectors and for coupling the input circuit of said second differential amplifier to the remaining two photo-detectors.

10. The combination as set forth in claim 2 further including an optical viewing device coupled between said transducer device and said image converter.

11. The combination as set forth in claim 10 wherein said optical viewing device includes a beamsplitter and an imaging platen optically coacting therewith.

12. The combination as set forth in claim 1 wherein said detection means detects the initiation of a shaft in the position of at least a substantial portion of said output light image.

13. The combination as set forth in claim 9 wherein said detection means detects the initiation of a shift in the position of at least a substantial portion of said output light image.

14. A data pattern motion cancelling system comprising:
    (a) an image intensifier for converting an input light image into a corresponding deflectable electrical image and for reconverting said electrical image back into an output light image;
    (b) four photo-detectors optically coacting with said image intensifier for converting light energy associated with said output light image into electrical energy;
    (c) first means for producing a first magnetic field within said image intensifier;
    (d) second deflection means for producing a second magnetic field within said image intensifier substantially orthogonal to said first magnetic field;
    (e) a first differential amplifier having an input circuit coupled to two of said photo-detectors and having an output circuit coupled to said first deflection means; and
    (f) a second differential amplifier having an input circuit coupled to the remaining two photo-detectors and having an output circuit coupled to said second magnetic deflection means.

15. The combination as set forth in claim 14 further including means for positioning said four photo-detectors apart from said image intensifier and an optical viewing device positioned intermediate said image intensifier and said four photo-detectors for manifesting a stabilized light image.

No references cited.

RALPH G. NILSON, *Primary Examiner.*

M. ABRAMSON, *Assistant Examiner.*